United States Patent [19]

Hirayama et al.

[11] Patent Number: 6,028,123
[45] Date of Patent: *Feb. 22, 2000

[54] ACRYLIC RESIN COMPOSITION FOR COLOR FILTER

[75] Inventors: Takayuki Hirayama, Kawasaki; Junichiro Tanimoto; Yutaka Otsuki, both of Yokohama; Masayuki Ando, Funabashi, all of Japan

[73] Assignees: Nippon Oil Co., Ltd.; Dai Nippon Printing Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,232

[22] Filed: Aug. 15, 1997

[30] Foreign Application Priority Data

Aug. 22, 1996 [JP] Japan ................................ 8-221105

[51] Int. Cl.$^7$ ................ C08J 3/28; C08F 2/46; C08F 222/40; C08L 39/00
[52] U.S. Cl. ................ 522/151; 522/33; 522/47; 522/153; 524/555; 526/262; 526/318.42
[58] Field of Search ................ 522/151, 153, 522/33, 109; 524/555, 385; 526/262, 318.42; 525/385

[56] References Cited

U.S. PATENT DOCUMENTS

| | | | |
|---|---|---|---|
| 5,449,731 | 9/1995 | Suzuki et al. | 526/322 |
| 5,473,032 | 12/1995 | Bederke et al. | 524/555 |

FOREIGN PATENT DOCUMENTS

| | | |
|---|---|---|
| 295012 | 12/1988 | European Pat. Off. . |
| 3633456 | 4/1987 | Germany . |
| 1255913 | 11/1986 | Japan . |
| 2138510 | 6/1987 | Japan . |
| 1-144473 | 6/1989 | Japan . |
| 1-304162 | 12/1989 | Japan . |

*Primary Examiner*—Tae Yoon
*Attorney, Agent, or Firm*—Darby & Darby

[57] ABSTRACT

An acrylic resin composition for a color filter containing 100 parts by weight of an acrylic resin having acid value of 5 to 100 mgKOH/g and 5 to 90 parts by weight of a coloring pigment is provided. The acrylic resin has been prepared by polymerizing a monomer mixture containing 1 to 6% by weight of α, β-unsaturated carboxylic acid, 10 to 80% by weight of α, β-unsaturated carboxylate, and 5 to 30% by weight of N-substituted maleimide.

11 Claims, 2 Drawing Sheets

ACRYLIC RESIN COMPOSITION FOR COLOR FILTER

FIELD OF ART

This invention relates to an acrylic resin composition for a color filter, in particular to an acrylic rein composition for a color filter used in color liquid crystal displays or displays of color video cameras. The acrylic resin composition of the present invention can provide a colored coating film for a color filter having remarkably improved heat resistance and heat stability.

BACKGROUND OF THE INVENTION

There has been an increasing demand for color filters mainly for liquid crystal displays mounted on laptop computers. In addition, demand for color filters for car navigation systems, video cameras, or mobile computing terminals has also been increasing recently. Since these devices are used outdoors in most cases, improved heat resistance and heat stability of the color filter are required, compared to those for computers mainly used indoors.

As a base material for a colored coating film in a color filter, acrylic resins or polyimide reins are usually employed. Polyimide resins have excellent heat resistance, but have poor properties in pattern development. On the other hand, acrylic resins has excellent properties in pattern development, but have inferior heat resistance to that of polyimide, which will cause discoloration or weight loss of the coating films in pixels, when the substrate is left under high temperature and humidity for a prolonged period of time.

In order to improve the heat resistance of an acrylic resin, efforts are made usually to raise the glass-transition temperature of the resin itself by a variety of means, for example, by increasing the molecular weight of the acrylic resin, or by increasing the content of methacrylic monomers. However, these techniques have disadvantages in that the viscosity of the resin is considerably increased, which leads to poor storage stability of the colored coating material and insufficient handling properties in preparation of the coating material.

Among the acrylic resins, known as a composition having excellent weatherability and heat resistance is an electrodeposition coating material composition used for vehicles, aluminum material for building, domestic electric appliances, or office machines to improve anti-corrosion properties and surface finish, disclosed, for example in Japanese Laid-open Patent Application Nos. 1-144473 and 1-304162. These publications disclose, in particular, that resins obtained by mixing and polymerizing particular amounts of a (meth)acrylic monomer having an acid group, a (meth)acrylic monomer having a hydroxyl group, a (meth) acrylate monomer, and N-alkyl substituted maleimide exhibit excellent resistance to heat and chemicals, as well as superior adhesivity to a material to be coated. However, the electrodeposition coating materials disclosed in these publications are merely clear varnish without any pigments contained. In addition, the thickness of the coating film to be formed is as thick as 20 to 35 $\mu$m. Therefore, it is not intended to use these reins for a color filter. Still less, the properties of the resins when mixed with coloring pigments have not been studied.

SUMMARY OF THE INVENTION

It is an object of the present invention to provide an acrylic resin composition for a color filter which itself has excellent storage stability, and which gives superior heat resistance and heat stability to the hardened product to be obtained.

According to the present invention, there is provided an acrylic resin composition for a color filter comprising 100 parts by weight of an acrylic resin having acid value of 5 to 100 mgKOH/g (referred to as acrylic resin A hereinafter) and 5 to 90 parts by weight of a coloring pigment, said acrylic resin having been prepared by polymerizing a monomer mixture comprising 1 to 6% by weight of $\alpha$, $\beta$-unsaturated carboxylic acid, 10 to 80% by weight of $\alpha$, $\beta$-unsaturated carboxylate, and 5 to 30% by weight of N-substituted maleimide.

The present invention includes the following embodiments: a photocuring resin composition for a color filter comprising the acrylic resin A, a coloring pigment, a compound having at least one ethylenic unsaturated double bond in a molecule thereof, and a photopolymerization initiator; a thermosetting resin composition for a color filter comprising the acrylic resin A and a coloring pigment; and an electrodeposition coating material composition for a color filter comprising the acrylic resin A and a coloring pigment.

PREFERRED EMBODIMENTS OF THE INVENTION

Figure 1:
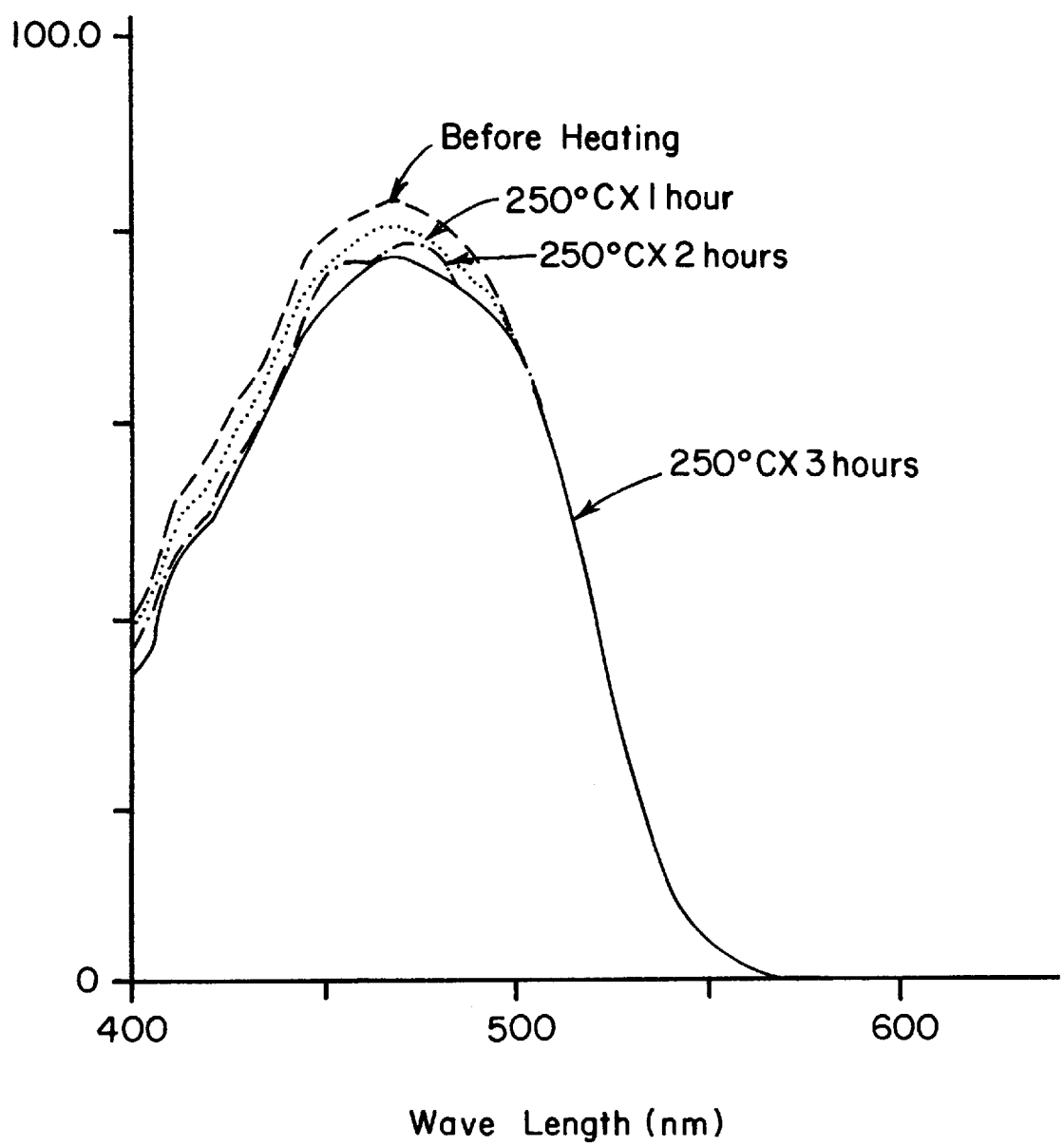
FIG. 1 is a graph showing spectral distributions of the coating film forming a blue-hued pixel measured in Example 13.

The present invention will be explained in more detail hereinbelow.

The acrylic resin A contained in the composition of the present invention as a requisite component is prepared by polymerizing a monomer mixture containing 1 to 6% by weight of $\alpha$, $\beta$-unsaturated carboxylic acid, 10 to 80% by weight of $\alpha$, $\beta$-unsaturated carboxylate, 5 to 30% by weight of N-substituted maleimide, and optionally 0 to 60% by weight of a compound having a double bond other than the above compounds. The acrylic resin A has acid value of 5 to 100 mgKOH/g, preferably 10 to 50 mgKOH/g. The acid value herein is measured in accordance with JIS K2501. If the acid value of the acrylic resin A is less than 5 mgKOH/g, the produced coating film will be developed defectively, or sufficient water-dispersibility of the acrylic resin A cannot be achieved when the resin composition is used for preparing an electrodeposition coating material. On the other hand, if the acid value exceeds 100 mgKOH/g, the resistance of the color filter to moisture and the resistance of the coating film to a developing solution are lowered.

Examples of the $\alpha$, $\beta$-unsaturated carboxylic acid may include acrylic acid, methacrylic acid, itaconic acid, maleic acid, fumaric acid, crotonic acid, citraconic acid, mesaconic acid, and $\alpha$-chloroacrylic acid. Two or more kinds of $\alpha$, $\beta$-unsaturated carboxylic acid may be used together. Alternatively, functional derivatives of $\alpha$, $\beta$-unsaturated carboxylic acid having at least one carboxyl group, for example, partial esters or amides of unsaturated polymerizable di- or poly-carboxylic acid, or mixtures thereof, may be used as the $\alpha$, $\beta$-unsaturated carboxylic acid.

If the content of the $\alpha$, $\beta$-unsaturated carboxylic acid in the monomer mixture is less than 1% by weight, the coating film will be developed defectively, or sufficient water-dispersibility of the acrylic resin A cannot be achieved when the resin composition is used for preparing an electrodeposition coating material. On the other hand, if the content of the α, β-unsaturated carboxylic acid in the monomer mixture exceeds 6% by weight, the resistance of the color filter to moisture and the resistance of the coating film to a developing solution are lowered.

The α, β-unsaturated carboxylate gives suitable hardness to the produced coating film, and improves adhesivity of the coating film to a glass plate. Further, it improves water-dispersibility of the acrylic resin A in preparing an electrodeposition coating material, and improves film forming properties of the electrodeposition coating material upon electrodeposition, thereby allowing efficient electrodeposition. Examples of the α, β-unsaturated carboxylate may include methyl (meth)acrylate, ethyl (meth)acrylate, butyl (meth)acrylate, isobutyl (meth)acrylate, hexyl (meth)acrylate, lauryl (meth)acrylate, cetyl acrylate, stearyl acrylate, cyclohexyl (meth)acrylate, benzyl (meth)acrylate, isobornyl (meth)acrylate, 2-methoxyethyl (meth)acrylate, 3-methoxybutyl (meth)acrylate, ethylcarbitol (meth)acrylate, phenoxyethyl (meth)acrylate, trifluoroethyl (meth)acrylate, tetrafluoropropyl (meth)acrylate, hexafluoropropyl (meth)acrylate, octafluoropentyl (meth)acrylate, heptadecafluorodecyl (meth)acrylate, trimethylsiloxyethyl (meth)acrylate, tetrahydrofurfuryl (meth)acrylate, phenoxypolyethylene glycol(meth)acrylate, methoxytripropylene glycol (meth)acrylate, and methoxytriethylene glycol (meth)acrylate. Two or more kinds of the above α, β-unsaturated carboxylate may be used together.

If the content of the α, β-unsaturated carboxylate in the monomer mixture is less than 10% by weight, the water-dispersibility of the acrylic resin A is lowered, so that the composition hardly exhibits film forming properties under the normal electrodeposition conditions. On the other hand, if the content of the α, β-unsaturated carboxylate exceeds 80% by weight, the content of N-substituted maleimide monomer which gives heat resistance, as will be described later, will relatively be lowered, so that sufficient heat resistance cannot be achieved.

Examples of the N-substituted maleimide may include N-cyclohexylmaleimide, N-2-methylcyclohexylmaleimide, N-2-ethylcyclohexylmaleimide, N-2-chlorocyclohexylmaleimide, N-phenylmaleimide, N-2-methylphenylmaleimide, N-2-ethylphenylmaleimide, and N-2-chlorophenylmaleimide. Of these, N-cyclohexylmaleimide, N-2-methylcyclohexylmaleimide, and N-2-ethylcyclohexylmaleimide are particularly preferred to give excellent transparency to the obtained resin. Two or more kinds of N-substituted maleimide may be used together.

If the content of the N-substituted maleimide in the monomer mixture is less than 5% by weight, coating film having sufficient heat resistance cannot be obtained. On the other hand, if the content exceeds 30% by weight, the glass transition point of the obtained acrylic resin A becomes exceedingly high to cause whiting of the pixels and defective patterning, or a color filter having the film thickness of less than 2 μm can hardly be produced. Further, compatibility of the acrylic resin A and the coloring pigment is lowered, thereby weakening the produced coating film and lowering the adhesivity to a glass plate.

In the composition of the present invention, the monomer mixture for preparing the acrylic resin A may further contain a compound having a double bond other than the above requisite components. Examples of such compound having a double bond may include styrene monomers such as styrene, o-methylstyrene, m-methylstyrene, p-methylstyrene, p-methoxystyrene, p-tert-butylstyrene, p-phenylstyrene, o-chlorostyrene, m-chlorostyrene, or p-chlorostyrene; amides or amide derivatives of α, β-unsaturated carboxylic acid such as (meth)acrylamide, methylol (meth)acrylamide, alkoxymethylol (meth)acrylamide, or diacetone(meth)acrylamide; ethylene, propylene, butylene, vinyl chloride, vinyl acetate, acrylonitrile, and N-vinylpyrolidone. Two or more kinds of the compounds having a double bond may be used together.

If the content of the compound having a double bond other than the requisite components in the monomer mixture exceeds 60% by weight, the desired effects of the present invention may not be obtained, thus being not preferred.

When the acrylic resin composition of the present invention is used as a thermosetting resin composition or an electrodeposition coating resin composition, a curing agent such as melamine may be added to the composition. In that case, for effecting reaction of the acrylic resin A with such curing agent, the compound having a double bond other than the requisite components contained in the monomer mixture for preparing the acrylic resin A may preferably be a monomer having a hydroxyalkyl group such as (meth)acrylate having a hydroxyalkyl group for copolymerization with other monomers in the monomer mixture. Examples of the (meth)acrylate having a hydroxyalkyl group may include $CH_2=CHCOOCH_2CH_2OH$, $CH_2=C(CH_3)COOCH_2CH_2OH$, $CH_2=CHCOOCH_2CH(OH)CH_2Cl$, $CH_2=C(CH_3)COOCH_2CH(OH)CH_2Cl$, $CH_2=CHCOOCH(CH_3)CH_2OH$, $CH_2=C(CH_3)COOCH(CH_3)CH_2OH$, $CH_2=CHCOOCH_2CH(OH)CH_3$, $CH_2=C(CH_3)COOCH_2CH(OH)CH_3$, $CH_2=CHCOOCH_2CH_2CH_2OH$, $CH_2=C(CH_3)COOCH_2CH_2CH_2OH$, $CH_2=CHCOOCH_2CH(OH)CH_2OH$, $CH_2=C(CH_3)COOCH_2CH(OH)CH_2OH$, $CH_2=CHCOOCH_2CH(OH)CH_2CH_3$, $CH_2=C(CH_3)COOCH_2CH(OH)CH_2CH_3$, $CH_2=CHCOOCH_2CH_2CH_2CH_2OH$, $CH_2=C(CH_3)COOCH_2CH_2CH_2CH_2OH$, $CH_2=CHCOOCH_2CH_2OCH_2CH_2OH$, $CH_2=C(CH_3)COOCH_2CH_2OCH_2CH_2OH$, $CH_2=CHCOOCH_2CH_2OCO-X-COOCH_2CH(OH)CH_3$, $CH_2=CHCOOCH_2CH_2OCO-X-COOCH_2CH_2OH$, and $CH_2=CHCOOCH_2CH(OH)CH_2O-Ph$. Of these, $CH_2=CHCOOCH_2CH_2OH$ and $CH_2=C(CH_3)COOCH_2CH_2OH$ are particularly preferred. Incidentally, X stands for an o-phenylene group, and Ph stands for a phenyl group in the formulae. Two or more kinds of these monomers having a hydroxyalkyl group may be used together.

When the monomer having a hydroxyalkyl group is used, the content thereof in the monomer mixture is preferably 3 to 30% by weight.

The polymerization of the monomer mixture may be effected by mixing the monomer mixture under heating in the presence of an organic solvent and a polymerization initiator, and optionally by regulating the reaction by adding a polymerization regulator. The monomer mixture may be polymerized by radical polymerization or anionic polymerization. For example, solution polymerization, suspension polymerization, emulsion polymerization, precipitation polymerization, or bulk polymerization may be employed. Of these, the solution polymerization is preferred. Conditions for the polymerization may suitably be selected. In the solution polymerization, for example, the suitable polymerization temperature is 40 to 150° C. The organic solvent for polymerization may be methyl alcohol, ethyl alcohol, n-propyl alcohol, isopropyl alcohol, n-butyl alcohol, isobutyl alcohol, methyl ethyl ketone, hexane, butyl cellosolve, diethylene glycol dimethyl ether, triethylene glycol dimethyl ether, or the like.

The acrylic resin composition of the present invention contains a coloring pigment as a requisite component. The coloring pigment may suitably be selected depending on the intended hue. However, it is desired to select a pigment which does not adversely affect the stability and applicability of the coating material, and transparency and durability of the produced coating film. In view of these, for example, organic pigments such as azo lake, quinacridone, phthalocyanine, isoindolinone, anthraquinone, thioindigo, xanthene, indigo, dioxazine, or indanthrene; or inorganic pigments such as chrome yellow, iron oxide, chrome vermilion, chrome green, ultramarine, Prussian blue, cobalt blue, cobalt green, emerald green, titanium white, or carbon black may be used. Further, two or more kinds of the above coloring pigments may be mixed depending on the intended hue, as long as the properties of the pigments are not deteriorated. Specific examples of the useful coloring pigments may include, phthalocyanine blue (C.I. pigment blue 15:6 or C.I. pigment blue 15:3, for example, trade name "RIONOL BLUE ES" manufactured by TOYO INK SEIZO CORPORATION, or trade name "CHROMOBLUE A3R" manufactured by CIBA GEIGY AG), phthalocyanine green (C.I. pigment green 7, 36 or C.I. pigment green 37, for example, trade name "RIONOL GREEN 2YS" manufactured by TOYO INK SEIZO CORPORATION), perylene pigments (C.I. pigment red 155), anthraquinone pigments (C.I. pigment red 177, for example, trade name "RIONOGEN RED GD" manufactured by TOYO INK SEIZO CORPORATION, or trade name "CHROMOPHTHAL RED BRN" manufactured by CIBA GEIGY AG), furnace black (for example, trade name "MA100R", "#4000", "#4010", or "#45" manufactured by MITSUBISHI KASEI CO., LTD., or trade name "MOGUL-L" or "REGAL400R" manufactured by CABLACK CORPORATION), or channel black (for example, trade name "COLOR BLACK FW200", "SPECIAL BLACK 5", or "PRINTEX 75" manufactured by DEGUSSA JAPAN, CO., LTD.). Further, for color adjustment, C.I. pigment yellow 83, C.I. pigment yellow 154 (for example, trade name "RIONOGEN YELLOW 3G" manufactured by TOYO INK SEIZO CORPORATION), C.I. pigment violet 23 (for example, trade name "RIONOGEN VIOLET RL" manufactured by TOYO INK SEIZO CORPORATION), or the like may be used.

The mixing ratio of the coloring pigment is 5 to 90 parts by weight, preferably 10 to 80 parts by weight, based on 100 parts by weight of the acrylic resin A. If the content of the coloring pigment is less than 5 parts by weight, sufficient contrast of the color filter cannot be obtained, while if the content exceeds 90 parts by weight, crystallization or deterioration of the film quality may occur.

The coloring pigment may be mixed in the composition of the present invention by dispersing the coloring pigment in the composition using a dispersing apparatus such as a roll mill, a sand mill, a ball mill, or an attriter. A composition wherein a coloring pigment containing carbon black or mixed color black is dispersed can be used for producing a black matrix of a color filter.

The acrylic resin composition of the present invention may further be mixed with a compound having at least one ethylenic unsaturated double bond in a molecule thereof and a photopolymerization initiator, thereby preparing a photocuring resin composition for a color filter.

The compound having at least one ethylenic unsaturated double bond in a molecule thereof is preferably, for example, a compound having the boiling point of 100° C. or higher at the normal pressure. Examples of the compound having at least one ethylenic unsaturated double bond in a molecule thereof may include polyethylene glycol di(meth)acrylate, polypropylene glycol di(meth)acrylate, trimethylolethane triacrylate, trimethylolpropane triacrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanedyol di(meth)acrylate, trimethylolpropane tri(acryloyloxypropyl) ether, tri(acryloyloxyethyl) isocyanurate, tri(acryloyloxyethyl) cyanurate, glycerine tri(meth)acrylate; (meth)acrylate of an addition reaction product prepared by adding ethylene oxide or propylene oxide to a polyfunctional alcohol such as trimethylolpropane or glycerine; or polyfunctional acrylate or methacrylate such as urethane acrylates as disclosed in Japanese Patent Publication No. 48-41708 or 50-6034, or Japanese Laid-open Patent Application No. 51-37193, polyester acrylates as disclosed in Japanese Laid-open Patent Application No. 48-64183, Japanese Patent Publication No. 49-43191 or 52-30490, or epoxy acrylates which is a reaction product of an epoxy resin and (meth)acrylic acid. Of these, trimethylolpropane tri(meth)acrylate, pentaerythritol tetra(meth)acrylate, dipentaerythritol hexa(meth)acrylate, and dipentaerythritol penta(meth)acrylate are particularly preferred. Two or more kinds of such compounds having at least one ethylenic unsaturated double bond in a molecule thereof may be used together.

Alternatively, the compound having at least one ethylenic unsaturated double bond in a molecule thereof may also has an acid group such as a carboxyl group. By employing such a compound having both an acid group and an ethylenic unsaturated double bond in a molecule thereof, polymerization of the compound having at least one ethylenic unsaturated double bond with other components in the composition under exposure to atmosphere is accelerated, and the development can be carried out with an aqueous developing solution, thus being particularly preferred. Examples of the compound having both an acid group and an ethylenic unsaturated double bond in a molecule thereof may include carboxylic acid addition product of epoxy (meth)acrylate prepared by reacting an acid anhydride with a hydroxyl group generated by reacting (meth)acrylic acid with an epoxy group contained in a bisphenol A epoxy resin, bisphenol F epoxy resin, novolak epoxy resin, polycarboxylic acid polyglycidyl ester, polyol polyglycidyl ether, aliphatic or alicyclic epoxy resin, an amine epoxy resin, triphenolmethane epoxy resin, or dihydroxybenzene epoxy resin; a copolymer of maleic anhydride and ethylene, propylene, isobutylene, styrene, vinylphenol, acrylic acid, acrylate, or acrylamide, half-esterified by reacting the maleic anhydride portion of the copolymer with an acrylate having an alcoholic hydroxyl group such as hydroxyethyl acrylate or an acrylate having an epoxy group such as glycidyl methacrylate; a compound prepared by reacting acrylic acid with a hydroxyl group contained in a copolymer of acrylic acid or acrylate and an acrylate having an alcoholic hydroxyl group such as hydroxyethyl acrylate; and mixtures thereof.

When the compound having both an acid group and an ethylenic unsaturated double bond in a molecule thereof is used, it is preferred to use an additional epoxy compound for further improving the heat resistance since the compound having both an acid group and an ethylenic unsaturated double bond in a molecule thereof and the epoxy compound thermally react to generate cross-linking. Examples of the epoxy compound may include a bisphenol A epoxy resin, bisphenol F epoxy resin, novolak epoxy resin, polycarboxylic acid polyglycidyl ester, polyol polyglycidyl ether, aliphatic or alicyclic epoxy resin, amine epoxy resin, trisphenolmethane epoxy resin, and dihydroxyphenyl epoxy resin.

The mixing ratio of the epoxy compound is usually not more than 40 parts by weight, preferably 5 to 20 parts by weight, based on 100 parts by weight of the compound having both an acid group and an ethylenic unsaturated double bond in a molecule thereof.

The mixing ratio of the compound having at least one ethylenic unsaturated double bond in a molecule thereof in preparing the photocuring resin composition is usually 5 to 100 parts by weight, preferably 10 to 80 parts by weight, based on 100 parts by weight of the acrylic resin composition. If the mixing ratio is less than 5 parts by weight, the photocuring time will be extended and the adhesive strength is lowered. If the mixing ratio exceeds 100 parts by weight, the adhesivity of the photocuring layer becomes exceedingly strong, so that, when a soft contact type exposure is used, the photocuring resin will adhere to the photomask, thereby undesirably contaminating the photomask.

Examples of the photopolymerization initiator to be mixed for preparing a photocuring resin composition may include α-diketones such as benzyl or diacetyl; acyloins such as benzoin; acyloin ethers such as benzoin methyl ether, benzoin ethyl ether, or benzoin isopropyl ether; thioxanthones such as thioxanthone, 2,4-diethylthioxanthone, thioxanthone-1-sulfonic acid, or thioxanthone-4-sulfonic acid; benzophenones such as benzophenone, 4,4'-bis(dimethylamino)benzophenone, or 4,4'-bis(diethylamino)benzophenone; acetophenones such as acetophenone, p-dimethylaminoacetophenone, α,α'-dimethoxyacetoxyacetophenone, 2,2'-dimethoxy-2-phenylacetophenone, p-methoxyacetophenone, or 2-methyl-(4-(methylthio)phenyl) -2-morpholino-1-propane; quinones such as anthraquinone or 1,4-naphthoquinone; halides such as phenanthyl chloride, tribromomethylphenylsulfone, tris (trichloromethyl)-s-triazine, 2,4-bis(trichloromethyl)-6-(4-methoxyphenyl)triazine, or compounds disclosed in Japanese Laid-open Patent Application No. 63-153542; and peroxides such as di-t-butylperoxide. Of these, 2,2'-dimethoxy-2-phenylacetophenone and 2-methyl-(4-(methylthio)phenyl)-2-morpholino-1-propanone (trade name "IRGACURE 907" manufactured by CIBA GEIGY AG or the like) are particularly preferred. Particularly preferred examples may include 2-trichloromethyl-4'-butoxystiryl-1,3,4-oxaziazol, 2,4-bis(trichloromethyl)-6-(4'-methoxyphenyl)-s-triazine, 2,4-bis(trichloromethyl)-6-(4'-(N,N-diethoxycarbonylmethylamino)-3'-bromo)phenyl-s-triazine, and 4-(p-N,N-di(ethoxycarbonylmethyl)-2,6-di(trichloromethy)-s-triazine). Two or more kinds of photopolymerization initiator may be used together.

The mixing ratio of the photopolymerization initiator for preparing the photocuring resin composition is preferably 0.1 to 30 parts by weight, more preferably 0.15 to 15 parts by weight, based on 100 parts by weight of the compound having at least one ethylenic unsaturated double bond in a molecule thereof. If the mixing ratio of the photopolymerization initiator is less than 0.1 parts by weight, sensitivity of the photocuring resin composition is lowered, while the mixing ratio exceeds 30 parts by weight, crystallization or deterioration of the film quality may occur, thus being not preferred.

The photocuring resin composition may further contain additional additives such as a thermal polymerization inhibitor, an adhesion promoter, a dispersing agent, a plasticizer, a sagging inhibitor, a leveling agent, a defoaming agent, a flame retarder, a brightener, a coloring agent, or the like.

Using the photocuring resin composition containing the acrylic resin composition of the present invention, a photocuring resin composition layer may be formed on a substrate for producing a color filter by dissolving the components of the composition in an organic solvent to obtain a solution, and applying the solution on the substrate followed by drying, or by applying the solution on a temporary support, drying, and transferring the obtained layer onto the substrate. Examples of the organic solvents used for this purpose may include ketones such as methyl ethyl ketone or cyclohexanone; aromatic hydrocarbons such as toluene or xylene; alkoxyethanols such as methoxyethanol, ethoxyethanol, or butoxyethanol; carbitols such as carbitol or butylcarbitol; acetates such as ethyl acetate, butyl acetate, ethoxyethanol acetate, butoxyethanol acetate, carbitol acetate, or butylcarbitol acetate; or methyl lactate, or ethyl lactate. Two or more kinds of the organic solvents may be used together.

Using the above photocuring resin composition, color filter layers may be formed by applying the composition on a substrate, heating the composition on the substrate at a relatively low temperature for drying and adjusting the adhesivity of the surface, and exposing the obtained coating film to light via a pattern mask. Elimination of the adhesivity of the coating film surface by drying the coating film under heating before irradiating the active rays onto the coating film, allows arrangement of the pattern mask for exposure in close contact with the coating film to be cured. Subsequently, the coating film is subjected to development using an alkaline aqueous solution to dissolve uncured coating film portion, thereby forming pixels.

The photocuring resin composition may be applied onto the substrate by, for example, spin coating method, spray coating method, dipping method, brushing method, roll coating method, flow coating method, curtain coating method, screen printing method, dispenser coating method, or bar coating method. In particular, for coating on a printed circuit board or a thin metal film, spin coating method, bar coating method, roll coating method, curtain coating method, screen printing method, and dispenser coating method are preferred.

Light source for exposure to be used for photocuring the photocuring resin composition may be, for example, a low-pressure mercury lamp, a medium-pressure mercury lamp, a high-pressure mercury lamp, an ultra-high pressure mercury lamp, a xenon lamp, a metal hydride lamp, or laser beam. It is preferred to use an exposure device having a high-pressure mercury lamp, ultra-high pressure mercury lamp, or metal hydride lamp as a light source, irradiating ultraviolet rays near 300 to 400 nm.

Development of the photocuring resin composition exposed to light may be carried out with an alkaline aqueous solution. The alkaline aqueous solution used as a developing solution may be a 0.1 to 10% by weight aqueous solution of sodium hydroxide, potassium hydroxide, lithium hydroxide, sodium carbonate, potassium carbonate, lithium carbonate, or ammonia. In some cases, amines may be used, including primary amines such as butylamine, hexylamine, benzylamine, or allylamine; secondary amines such as diethylamine or benzylethylamine; tertiary amines such as triethylamine; hydroxyl amines such as ethanolamine, diethanolamine, triethanolamine, or 2-amino-1,3-propanedyol; cyclic amines such as morpholine, pirydine, piperazine, or piperidine; polyamines including hydrazine, ethylenediamine, and hexamehtylenediamine; basic salts of the aforementioned amines such as sulfate, carbonate, bicarbonate, alkaline metal phosphate, or pyrophosphate of the aforementioned amines; or quaternary ammonium hydroxide such as tetramethylammonium hydroxide or choline.

The acrylic resin composition of the present invention may be used as a thermosetting resin composition for color filter by optionally mixing with a curing agent.

Examples of such curing agent may include, for example, melamine, benzoguanamine, urea, or derivatives of these compounds; amino resins such as a melamine resin or urea resin; phenol resins; and blocked isocyanates. Of these, fully etherified melamine is particularly preferred since it is stable near the room temperature for a prolonged time period, and reacts near 100° C.

The mixing ratio of the curing agent for preparing the thermosetting resin composition is 0 to 100 parts by weight, preferably 5 to 80 parts by weight, based on 100 parts by weight of the acrylic resin composition. If the mixing ratio of the curing agent exceeds 80 parts by weight, the coating film will be weak, thus being not preferred.

The thermosetting resin composition may further contain a variety of assistant agents such as a dispersion assistant agent for dyes or pigments, a leveling agent for improving smoothness of the coating film, a viscosity adjustment agent, or a defoaming agent.

A color filter may be produced with the thermosetting resin composition containing the acrylic resin composition of the present invention preferably by a photolithographic method described below. Since an alkaline developing solution is used in this method, the thermosetting resin composition is required to be alkali soluble.

First, a black-hued thermosetting resin composition is applied over a support made of glass, polycarbonate, silicon wafer, plastic sheet, paper or the like by an application method such as bar coating, spin coating, roll coating, spray coating, dipping, gravure printing, or screen printing method, and dried to form a black-hued coating film. Then, over this black-hued coating film, photoresist which can be developed with alkali is applied by a bar coating, spin coating, roll coating, spray coating, dipping, gravure printing, or screen printing method, dried, and exposed to light through a photomask of a desired pattern. Subsequently, desired portions of the photoresist layer are developed with an alkaline developing solution and removed, while the portions of the black-hued coating film under the removed photoresist layer portions are also dissolved and removed together. Then, the black-hued coating film is heated for curing at as a low temperature as the photoresist will not be deteriorated and becomes unremovable, i.e. 80 to 150° C. Subsequently, the photoresist is developed and removed, thereby producing a substrate having a black matrix thereon.

Next, on the obtained substrate with a black matrix, a red-hued thermosetting resin composition is applied in the same way as in producing a black-hued coating film to produce a red-hued coating film. Over the red-hued coating film is applied photoresist which can be developed with alkali, and treated in the same way as n producing a black matrix, thereby leaving the portions of the red-hued coating film corresponding to the red pixels to embed the film between the black matrix. Subsequently, green- and blue-hued thermosetting resin compositions are applied and treated in the same way to produce a color filter.

Alternatively, first the photoresist is applied over the substrate, and portions of the photoresist corresponding to the black matrix to be formed are developed and removed by a photolithographic method. Then the black-hued thermosetting resin composition (black-hued coating material) is applied by a spin coater or the like, and heated at a low temperature, i.e. 80 to 150° C. so that the resist will not be deteriorated and become unremovable, thereby giving the black-hued coating film resistance against the developing solution. Finally, the remaining portions of the resist are developed and removed to produce a black matrix. Subsequently, red-, green- and blue-hued thermosetting resin compositions are applied and treated in the same way for forming colored pixels, thereby producing a color filter.

The photoresist described above may either be a positive or a negative type photoresist.

Preferable film thicknesses of the produced color filter coating films are usually 0.2 to 5.0 $\mu$m for both the black matrix and the colored pixels.

Alternatively, a color filter may be produced by off set printing, intaglio printing, or relief printing, photolithographic method is preferred for its precision.

The acrylic resin composition of the present invention may be used as an electrodeposition coating material composition for color filter by optionally mixing with a curing agent.

The curing agent may suitably be selected depending on the acrylic resin to be used. Examples of such curing agent may include, for example, melamine, benzoguanamine, urea, or derivatives of these compounds; amino resins such as a melamine resin or urea resin; phenol resins; or blocked isocyanates. Of these, a curing agent which is effective at a relatively low temperature is particularly preferred. Specifically, methylolmelamine at least partially etherified with one or more lower alcohols such as methanol, ethanol, propanol, or butanol, is preferably used.

The mixing ratio of the curing agent for preparing the electrodeposition coating material composition is suitably 0 to 80 parts by weight, preferably 5 to 60 parts by weight, based on 100 parts by weight of the acrylic resin composition. If the mixing ratio of the curing agent exceeds 80 parts by weight, the obtained coating film becomes weak, thus being not preferred.

The electrodeposition coating material composition containing the acrylic resin composition of the present invention may be used to prepare a colored electrodeposition coating material. In this case, the acrylic resin A, the coloring pigment, optionally the curing agent, and, if necessary, a reaction catalyst such as paratoluene sulfonic acid or dibutyltin dilaurate, an organic solvent, an anti-oxidant such as paramethoxyphenol, dibutylthio dipropionate, or tert-butylcatechol, an UV absorbing agent, or a variety of assistant agents such as a dispersion assistant agent for pigments, a leveling agent for improving smoothness of the coating film, a viscosity adjustment agent, or a defoaming agent, are mixed together, dispersed thoroughly using a conventional dispersing device such as a sand mill, a roll mill, or an attriter. The dispersion thus obtained is diluted with water to a desired concentration, preferably the solid content of about 4 to 25% by weight, more preferably 7 to 20% by weight, thereby preparing a colored electrodeposition coating material. The colored electrodeposition coating material thus obtained may be electrodeposited on an electrically conductive layer to form a colored layer.

The film thickness of the obtained colored layer is not particularly limited, and may suitably be selected depending on the properties required for the color filter. Preferred film thickness of the colored layer is usually 0.3 to 5 μm, preferably about 1 to 3 μm in dried state.

Conditions for electrodeposition may suitably be selected depending on the kind of the colored electrodeposition coating material to be used or desired film thickness of the colored layer. The voltage is usually 5 to 500 V, preferably 10 to 300 V dc, the electrodeposition time is usually 5 to 300 seconds, preferably 10 to 200 seconds, and the temperature of the coating material is usually 10 to 35° C., preferably 15 to 30° C. When the electrodeposition time required for forming a film of a desired thickness elapsed, energizing is stopped. Then the substrate is taken out of the electrodeposition bath, and excess bath solution is washed off with water or the like. After drying the substrate, the colored layer is obtained.

A color filter may be formed with the electrodeposition coating material composition containing the acrylic resin composition of the present invention by a various electrodeposition methods using a substrate provided with a transparent electrode or a transparent electrically conductive layer. Specific methods may include, for example, (1) a method including the steps of forming a black matrix on a glass plate or the like with the colored electrodeposition coating material hued in black, and forming each colored layer one by one with the colored electrodeposition coating materials hued in red, green, and blue, respectively; (2) a method including the steps of forming each colored layer one by one on a glass plate or the like with the colored electrodeposition coating materials hued in red, green, and blue, respectively, and forming a black matrix with the colored electrodeposition coating material hued in black, or (3) a method including the steps of forming a black matrix and each colored layer on separate or the same temporary support, and transferring the black matrix and the colored layers onto the substrate for color filter. More specifically, the methods disclosed in Japanese Laid-open Patent Application Nos. 4-280201, 4-287002, 4-324802, 4-326303, 4-326304, 4-326305, 4-361202, 4-362601, 5-11106, and 6-82621 may be employed.

The acrylic resin composition for a color filter of the present invention exhibits superior heat resistance and heat stability, and can be used as a base material for a coating material containing a photocuring resin composition, a thermosetting resin composition, or an electrodeposition coating material composition for producing colored pixels and a black matrix of a color filter. In the color filter produced with these coating materials, decrease in film thickness even at a high temperature and in chromaticity is hardly observed.

EXAMPLES

The present invention is now explained with reference to Examples and Comparative Examples. But the present invention is not limited thereto.

Synthesis Example 1
(Synthesis of Polymer A as Acrylic Resin A)

1500 g of triethylene glycol dimethyl ether was charged in a reactor of 5 liter capacity equipped with a stirrer, a condenser, and a thermometer, heated to 90° C., and stirred.

Next, a mixture composed of 500 g of isobutyl methacrylate, 196 g of butyl acrylate, 289 g of methyl methacrylate, 210 g of hydroxyethyl acrylate, 65 g of acrylic acid, 300 g of N-cyclohexylmaleimide, and 30 g of PERBUTYL-O (trade name, manufactured by NOF Corporation) as a polymerization initiator was continuously added dropwise over 4 hours, and subsequently reacted for additional 2 hours, thereby obtaining a varnish containing polymer A having the number average molecular weight of 14000. It was confirmed by potentiometric titration method that the polymer A had solid content of 50% by weight, acid value of 33.5 mgKOH/g, and hydroxyl value of 66.8 mgKOH/g.

Synthesis Examples 2 to 6
(Synthesis of Polymers B and C as Acrylic Resin A, and Polymers D, E, and F as Acrylic Resin other than Acrylic Resin A)

Polymers B to E were prepared, respectively, in the same way as for preparing the varnish containing polymer A above, except that the compositions of the monomers were changed as shown in Table 1. In these cases, polymer D did not contain N-substituted maleimide, and polymers E and F each contained α, β-unsaturated carboxylate and N-substituted maleimide in the amounts outside the range defined for the acrylic resin A of the present invention.

TABLE 1

|  | Polymer B | Polymer C | Polymer D | Polymer E | Polymer F |
|---|---|---|---|---|---|
| Isobutyl methacrylate | 400 g | 375 g | 345 g | 400 g | 525 g |
| Butyl acrylate | 317 g | 329 g | 520 g | 520 g | — |
| Methyl methacrylate | 439 g | — | 365 g | 315 g | 154 g |
| Cyclohexyl acrylate | — | 300 g | — | — | — |
| Acrylic Acid | 65 g | 86 g | 55 g | 86 g | 86 g |
| N-cyclohexyl Maleimide | 150 g | 200 g | — | 50 g | 525 g |
| Hydroxyethyl acrylate | 129 g | 210 g | 215 g | 129 g | 210 g |
| Acid Value (mgKOH/g) | 33.2 | 44.0 | 28.0 | 44.1 | 43.9 |
| Hydroxyl Value (mgKOH/g) | 41.1 | 67.1 | 68.7 | 41.0 | 66.9 |

Example 1
(Preparation of Photocuring Resin Composition for Color Filter)

120 g of polymer A prepared in Synthesis Example 1 (DMTG solution of 50% solid content), 1 g of 4-(p-N,N-di (ethoxycarbonylmethyl)-2,6-di(trichloromethyl)-s-triazine, 40 g of a mixture of dipentaerythritol hexaacrylate and pentaerythritol tetraacrylate (trade name "KAYARA DDPHA" manufactured by NIPPON KAYAKU CO., LTD.), 32 g of phthalocyanine blue (blue pigment, trade name "SR-150 C" manufactured by SANYO SHIKISO CORPORATION), and 370 g of cellosolve acetate were mixed to prepare a photocuring resin composition (H-1) for a color filter. The dispersion of the blue pigment was achieved by intimate mixing in a three-roll mill.

Example 2
(Preparation of Photocuring Resin Composition for Color Filter)

A photocuring resin composition (H-2) for a color filter was prepared in the same way as in Example 1 except that the blue pigment used in Example 1 was replaced with phthalocyanine green (green pigment, trade name "SAX" manufactured by SANYO SHIKISO CORPORATION).

Example 3
(Preparation of Photocuring Resin Composition for Color Filter)

A photocuring resin composition (H-3) for a color filter was prepared in the same way as in Example 1 except that the blue pigment used in Example 1 was replaced with an azo metallic salt pigment (red pigment, trade name "PIGMENT RED 4BS" manufactured by SANYO SHIKISO CORPORATION).

Example 4
(Preparation of Photocuring Resin Composition for Color Filter)

A photocuring resin composition (H-4) for a color filter was prepared in the same way as in Example 1 except that the blue pigment used in Example 1 was replaced with carbon black (trade name "MA-100R" manufactured by MITSUBISHI KASEI CORPORATION).

Example 5
(Production of Color Filter)

Composition (H-4) prepared in Example 4 was applied over a glass plate by a roll coater, and dried at 100° C. for 2 minutes, thereby forming a film of 2 $\mu$m thick. Next, the film thus obtained was exposed to light from an ultra-high pressure mercury light in a nitrogen stream via a mask having a predetermined light-shielding pattern to print the light-shielding pattern on the film, and developed with a 1 wt % aqueous solution of sodium carbonate, thereby producing a glass substrate (a) having a black matrix thereon.

On the substrate (a), the compositions (H-1), (H-2), and (H-3) prepared in Examples 1 to 3, respectively, were applied one by one in the same way as for the composition (H-4) to form coating films providing pixel patterns, thereby producing a color filter (CF-1).

CF-1 was heated in an oven at 250 °C. for 1 hour. The film thicknesses of each of the colored films before and after the heating were measured, and from the difference between the two values, decrease ratio of film thickness was calculated. The results are shown in Table 3. It is noted from Table 3 that the decrease ratios of film thickness of each pixel and the black matrix are low. Further, spectral distributions of the color filter CF-1 before and after the heating were also measured to observe only a slight change in the spectral distribution. This shows that the obtained films have excellent heat resistance.

Example 6
(Preparation of Thermosetting Resin Composition for Color Filter)

160 g of polymer B prepared in Synthesis Example 2 (DMTG solution of 50% solid content), 20 g of a melamine resin (trade name "SUMIMAL M-66B" manufactured by SUMITOMO CHEMICAL CO., LTD.), 32 g of phthalocyanine blue (blue pigment, trade name "SR-150 C" manufactured by SANYO SHIKISO CORPORATION), and 350 g of cellosolve acetate were mixed to prepare a thermosetting resin composition (N-1) for a color filter.

Example 7
Preparation of Thermosetting Resin Composition for Color Filter

A thermosetting resin composition (N-2) for a color filter was prepared in the same way as in Example 6 except that the blue pigment used in Example 6 was replaced with phthalocyanine green (green pigment, trade name "SAX" manufactured by SANYO SHIKISO CORPORATION).

Example 8
(Preparation of Thermosetting Resin Composition for Color Filter)

A thermosetting resin composition (N-3) for a color filter was prepared in the same way as in Example 6 except that the blue pigment used in Example 6 was replaced with an azo metallic salt pigment (red pigment, trade name "PIGMENT RED 4BS" manufactured by SANYO SHIKISO CORPORATION).

Example 9
(Preparation of Thermosetting Resin Composition for Color Filter)

A thermosetting resin composition (N-4) for a color filter was prepared in the same way as in Example 6 except that the blue pigment used in Example 6 was replaced with carbon black (trade name "MA-100R" manufactured by MITSUBISHI KASEI CORPORATION).

Example 10
(Production of Color Filter)

Positive type photoresist composed of a naphthoquinonediazido compound and a novolak cresol resin (trade name "OFPR-800" manufactured by TOKYO OHKA KOGYO CO., LTD.) was applied over a glass plate by a spin coating method to form a coating film of a dry thickness of 2 $\mu$m. Then light from an ultra-high pressure mercury lamp was irradiated onto the resist through a mask having a predetermined light-shielding pattern. Subsequently, the resist was developed with a 2.4 wt % aqueous solution of tetramethylammonium hydroxide to selectively remove the portions of the positive type photoresist exposed to light for exposing the corresponding glass surface to outside. After the plate was washed with water and dried, the composition (N-4) prepared in Example 9 was applied on the plate by a spin coating method, dried at 100° C., and then developed with a 2.4 wt % aqueous solution of tetramethylammonium hydroxide to remove the positive type photoresist, thereby producing a glass substrate (b) having a black matrix thereon.

On the substrate (b), the compositions (N-1), (N-2), and (N-3) prepared in Examples 6 to 8, respectively, were applied and treated one by one in the same way as for the composition (N-4) to form coating films providing pixel patterns, thereby producing a color filter (CF-2)

CF-2 was subjected to the same tests as in Example 5. The results are shown in Table 3. It was revealed that the decrease ratios of film thickness of each pixel and the black matrix are low, and difference in the spectral distributions of the color filter (CF-2) before and after the heating was small, showing that the color filter (CF-2) has excellent heat resistance.

Example 11
(Preparation of Electrodeposition Coating Material Composition for Color Filter)

The varnish containing the polymer A prepared in Synthesis Example 1 was concentrated to a solid content of 80% by weight, neutralized with triethylamine to about pH 8, and mixed with deionized water, thereby preparing an aqueous resin solution (S2).

Next, to the aqueous resin solution (S2), carbon black, azo metallic salt red pigment, phthalocyanine green, and phthalocyanine blue were added, respectively, to prepare black-, red-, green-, and blue-hued pigment dispersions, respectively.

On the other hand, polymer A prepared in Synthesis Example 1 was mixed with a melamine resin (trade name "M-66B" manufactured by SUMITOMO CHEMICAL CO., LTD.), neutralized with triethylamine to about pH 8, and further mixed with deionized water, thereby preparing an aqueous resin solution (T2).

The aqueous resin solution (T2) was added to each of the pigment dispersions prepared above, to produce colored coating materials (Bk, R, G, B) each having the composition shown in Table 2. The coating materials thus obtained were thermosetting and anionic. The particle size distributions of the coating materials were measured by a particle size distribution measuring apparatus LA-910 (manufactured by HORIBA SEISAKUSHO). The results are shown in Table 2.

TABLE 2

| Color | Colored Coating Material Bk Black | Colored Coating Material R Red | Colored Coating Material G Green | Colored Coating Material B Blue |
|---|---|---|---|---|
| Polymer A | 750.0 g | 750.0 g | 750.0 g | 750.0 g |
| Melamine Resin (Note 1) | 250.0 g | 250.0 g | 250.0 g | 250.0 g |
| Triethylene-amine | 61.8 g | 61.8 g | 61.8 g | 61.8 g |
| Carbon Black (Note 2) | 300.0 g | — | — | — |
| Phthalocyanine Blue (Note 3) | — | — | — | 300.0 g |
| Phthalocyanine Green (Note 4) | — | — | 300.0 g | — |
| Azo Metallic Salt Pigment (Note 5) | — | 300.0 g | — | — |
| Average Particle Size (nm) | 165 | 135 | 147 | 140 |

Note 1: trade name "SUMIMAL M-66B" manufactured by SUMITOMO CHEMICAL CO., LTD.
Note 2: trade name "MOGUL-L" manufactured by CABLACK CORPORATION
Note 3: trade name "SR-150C" manufactured by SANYO SHIKISO CORPORATION
Note 4: trade name "SAX" manufactured by SANYO SHIKISO CORPORATION
Note 5: trade name "PIGMENT RED 4BS" manufactured by SANYO SHIKISO CORPORATION Example 12
(Production of Substrate Having Light-shielding Layer)

Positive type photoresist composed of a naphthoquinonediazido compound and a novolak cresol resin (trade name "OFPR-800" manufactured by TOKYO OHKA KOGYO CO., LTD. ) was applied over a 1.1 mm thick CORNING 7059 GLASS (trade name) having a 100 nm thick ITO (indium-tin oxide) film on the surface thereof by a spin coating method to form a coating film of a dry thickness of 3 μm. Then light from an ultra-high pressure mercury lamp was irradiated onto the resist at 70 mJ/cm² through a mask having a predetermined light-shielding pattern. Subsequently, the resist was developed with a 2.4 wt % aqueous solution of tetramethylammonium hydroxide to selectively remove the portions of the positive type photoresist exposed to light for exposing the corresponding ITO surface to outside. After the substrate was washed with water and dried, electrodeposition was carried out by applying DC voltage of 25V between a stainless steel beaker containing the anionic colored coating material Bk prepared in Example 11 as an anode and the above substrate as a cathode at 25° C. for 60 seconds. Then the substrate was taken out of the stainless steel beaker, washed with ion-exchanged water, and dried at 70° C. for 5 minutes. After the substrate was heated at 120° C. for 10 minutes, the entire surface of the substrate was exposed to light irradiation from the ultra-high pressure mercury lamp at 100 mJ/cm², and subsequently developed with a 2.4 wt % aqueous solution of tetramethylammonium hydroxide. As a result, no change was observed on the black-hued electrodeposited pattern, and remaining positive type photoresist was removed completely. After the substrate was washed with water and dried, a substrate having a 1.8 μm thick light-shielding layer of a high precision was obtained.

The optical density of the light-shielding layer was found to be 3.0, as measured by KONICA DENSITOMETER PDA-65 (trade name) manufactured by KONICA CORPORATION.

Example 13
(Production of Color Filter)

A color filter was produced by electrodeposition to be discussed below using the substrate having a light-shielding layer thereon produced in Example 12 (referred to as substrate 1 hereinbelow).

Positive type photoresist (trade name "OFPR-800" manufactured by TOKYO OHKA KOGYO CO., LTD.) was applied over the substrate 1 by a spin coating method to form a coating film having a dry thickness of 2.2 μm. Next, the coating film was exposed to light via a mosaic-patterned photomask wherein each light-transmitting portion is larger than the space between the light-shielding patterns by 10 μm at its top, bottom, right, and left sides, respectively. Subsequently, the coating film was developed to remove the portions of the photoresist exposed to light, thereby exposing the ITO film to outside. Using the substrate 1 as an anode and a stainless steel beaker containing the anionic colored coating material R prepared in Example 11 as a cathode, electrodeposition was carried out by applying DC voltage of 40 V between the electrodes at 25° C. for 10 seconds. Then the substrate 1 was taken out of the stainless steel beaker, washed with ion-exchanged water, dried, and heated at 120° C. for 10 minutes. Through these process, a mosaic patterned red-hued layer was formed on the substrate. Next, another mosaic pattern was formed adjacent to this mosaic patterned red-hued layer by light exposure and development, and a mosaic patterned green-hued layer was formed by electrodepositing and heating the colored coating material G prepared in Example 11 in the same way as in forming the red-hued layer. The same process was repeated for the colored coating material B prepared in Example 11, thereby producing a color filter. During the above electrodeposition processes, no colored coating material was coated over the light-shielding layer. Incidentally, the developing solution used was a 1 wt % aqueous solution of sodium hydroxide containing 5% by weight of a surface active agent (trade name "PEREX NBL" manufactured by KAO CO., LTD.). Lastly, the color filter thus obtained was heated at 180° C. for 30 minutes for completing curing, thereby obtaining a color filter (CF-3) having excellent transparency, homogeneity, and smoothness, as well as superior pattern precision.

CF-3 was subjected to the same tests as in Example 5. The results are shown in Table 3. From these results, it was revealed that the decrease ratios of film thickness of each pixel and the black matrix are low, and difference in the spectral distributions of the color filter (CF-3) before and after the heating was small, showing that the color filter (CF-3) has excellent heat resistance. On the other hand, spectral distributions of the coating film forming the blue-hued pixels of CF-3 before heating, after heating at 250° C. for 1 hour, 2 hours and 3 hours were respectively measured. The results are shown in FIG. 1.

Comparative Example 1
(Production of Color Filter)

Photocuring Resin Compositions (H-5 to H-8) for color filter were prepared in the same way as in Examples 1 to 4 except that the polymer A used in Examples 1 to 4 was replaced with polymer D prepared in Synthesis Example 4. Subsequently, a color filter (CF-4) was produced in the same way as in Example 5 except that the compositions (H-1), (H-2), (H-3), and (H-4) used in Example 5 were replaced with compositions (H-5), (H-6), (H-7), and (H-8), respectively.

CF-4 was subjected to the same tests as in Example 5. The results are shown in Table 3. From these results, it was revealed that the film thicknesses of each pixel and the black matrix were remarkably decreased, and difference in the spectral distributions of the color filter (CF-4) before and after the heating was large, showing that the color filter (CF-4) has poor heat resistance.

Comparative Example 2
(Production of Color Filter)

A color filter (CF-5) was produced in the same way as in Examples 12 and 13 using the same materials as in Example 11 except that the polymer A used in Example 11 was replaced with polymer E (content of N-cyclohexylmaleimide is less than 5% by weight) prepared in Synthesis Example 5. CF-5 was subjected to the same tests as in Example 5. The results are shown in Table 3. From these results, it was revealed that the film thicknesses of each pixel and the black matrix were remarkably decreased, and difference in the spectral distributions of the color filter (CF-5) before and after the heating was large, showing that the color filter (CF-5) has poor heat resistance.

Figure 2:
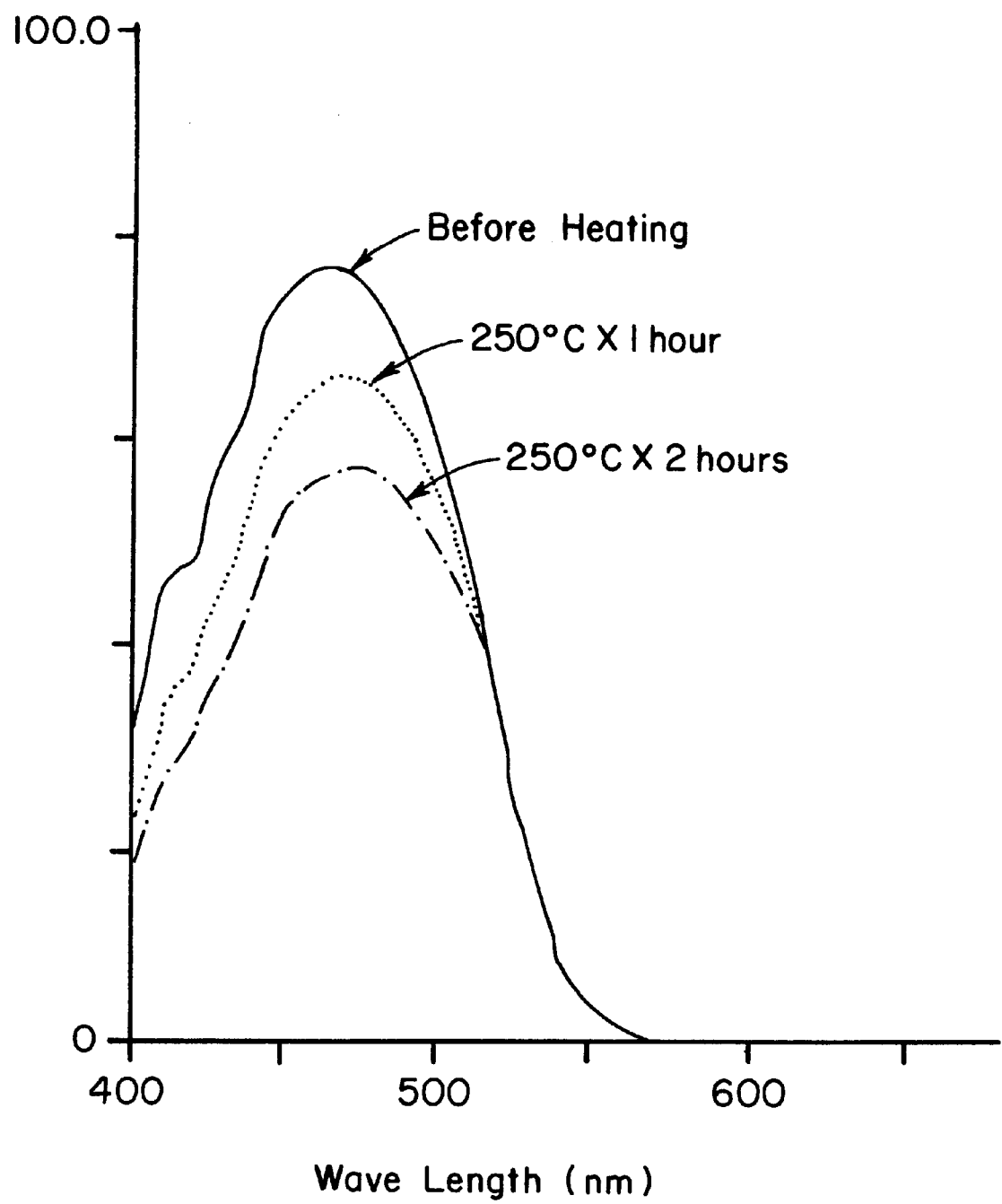
FIG. 2 is a graph showing spectral distributions of the coating film forming a blue-hued pixel measured in Comparative Example 2.

On the other hand, spectral distributions of the coating film forming the blue-hued pixels of CF-5 before heating, after heating at 250° C. for 1 hour, 2 hours, and 3 hours were respectively measured. The results are shown in FIG. 2.

Comparative Example 3
(Production of Color Filter)

A color filter was produced in the same way as in Examples 12 and 13 using the same materials as in Example 11 except that the polymer A used in Example 11 was replaced with polymer F (content of N-cyclohexylmaleimide exceeds 30% by weight) prepared in Synthesis Example 6. However, the black matrix and the pixels could not be electrodeposited in a uniform film thickness of 2 $\mu$m. In other words, the film thickness exceeds 10 $\mu$m under the normal electrodeposition conditions (discharge at 30 V for 15 seconds), whereas under the conditions at low voltage for a short period of time, the uniform film thickness could not be achieved over the entire surface of the substrate, and the surface of the coating film became rough.

Comparative Example 4
(Production of Color Filter)

A color filter (CF-6) was produced in the same way as in Example 10 using the same materials as in Examples 6 to 9 except that the polymer B used in Examples 6 to 9 was replaced with polymer F (content of N-cyclohexylmaleimide exceeds 30% by weight) prepared in Synthesis Example 6. CF-6 was subjected to the same tests as in Example 5. As a result, CF-6 exhibited good heat resistance, but had many whiting portions in the pixels and defectively shaped patterns since the viscosity of the resin was exceedingly high. Further, adhesivity of the coating film to the glass plate tended to be low possibly due to the poor compatibility with the pigments.

TABLE 3

| | | Change in Film Thickness | | | |
|---|---|---|---|---|---|
| | Color | Before Test ($\mu$m) | After Test ($\mu$m) | Difference ($\mu$m) | Decrease Ratio (%) |
| CF-1 | R | 2.03 | 1.99 | 0.04 | 2.0 |
| | G | 2.01 | 1.98 | 0.03 | 1.5 |
| | B | 2.02 | 1.97 | 0.05 | 2.5 |
| | Bk | 2.00 | 1.98 | 0.02 | 1.0 |
| CF-2 | R | 2.03 | 1.98 | 0.05 | 2.5 |
| | G | 2.04 | 1.97 | 0.07 | 3.4 |
| | B | 2.03 | 1.98 | 0.05 | 2.5 |
| | Bk | 2.02 | 1.99 | 0.03 | 1.5 |
| CF-3 | R | 1.98 | 1.91 | 0.07 | 3.5 |
| | G | 2.03 | 1.95 | 0.08 | 3.9 |
| | B | 2.01 | 1.94 | 0.07 | 3.5 |
| | Bk | 1.99 | 1.97 | 0.02 | 1.0 |
| CF-4 | R | 2.00 | 1.68 | 0.32 | 16.0 |
| | G | 2.01 | 1.59 | 0.42 | 20.9 |
| | B | 1.99 | 1.64 | 0.35 | 17.6 |
| | Bk | 2.01 | 1.76 | 0.25 | 12.4 |
| CF-5 | R | 2.01 | 1.75 | 0.26 | 12.9 |
| | G | 2.13 | 1.66 | 0.47 | 22.1 |
| | B | 2.10 | 1.71 | 0.39 | 18.6 |
| | Bk | 2.09 | 1.87 | 0.22 | 10.5 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An acrylic resin composition for electrodeposition for producing a color filter comprising:

100 parts by weight of an acrylic resin having acid value of 33.2 to 100 mgKOH/g, 5 to 90 parts by weight of a coloring pigment; a curing agent; a compound having at least one ethylenic unsaturated double bond in a molecule thereof; and a photopolymerization initiator;

said acrylic resin having been prepared by polymerizing a monomer mixture comprising 1 to 6% by weight of $\alpha$, $\beta$-unsaturated carboxylic acid, 10 to 85.7% by weight of $\alpha$, $\beta$-unsaturated carboxylate, and 5 to 30% by weight of N-substituted maleimide selected from the group consisting of N-cyclohexylmaleimide, N-2-methylcyclohexylmaleimide, N-2-ethylcyclohexylmaleimide, N-2-chlorocyclohexylmaleimide, N-phenylmaleimide, N-2-methylphenylmaleimide, N-2-ethylphenylmaleimide, N-2-chlorophenylmaleimide and mixtures thereof, said monomer mixture containing (meth)acrylate having a hydroxyalkyl group selected from the group consisting of $CH_2$=$CHCOOCH_2CH_2OH$, $CH_2$=$C(CH_3)COOCH_2CH_2OH$, $CH_2$=$CHCOOCH_2CH(OH)CH_2Cl$, $CH_2$=$C(CH_3)COOCH_2CH(OH)CH_2Cl$, $CH_2$=$CHCOOCH(CH_3)CH_2OH$, $CH_2$=$C(CH_3)COOCH(CH_3)CH_2OH$, $CH_2$=$CHCOOCH_2CH(OH)CH_3$, $CH_2$=$C(CH_3)COOCH_2CH(OH)CH_3$, $CH_2$=$CHCOOCH_2CH_2CH_2OH$, $CH_2$=$C(CH_3)COOCH_2CH_2CH_2OH$, $CH_2$=$CHCOOCH_2CH(OH)CH_2OH$, $CH_2$=$C(CH_3)COOCH_2CH(OH)CH_2OH$, $CH_2$=$CHCOOCH_2CH(OH)CH_2CH_3$, $CH_2$=$C(CH_3)COOCH_2CH(OH)CH_2CH_3$, CH₂=CHCOOCH₂CH₂CH₂CH₂OH, CH₂=C(CH₃)COOCH₂CH₂CH₂CH₂OH, CH₂=CHCOOCH₂CH₂OCH₂CH₂OH, CH₂=C(CH₃)COOCH₂CH₂OCH₂CH₂OH, CH₂=CHCOOCH₂CH₂OCO—X—COOCH₂CH(OH)CH₃, CH₂=CHCOOCH₂CH₂OCO—X—COOCH₂CH₂OH, CH₂=CHCOOCH₂CH(OH)CH₂O—Ph and mixtures thereof, wherein X stands for an o-phenylene group, and Ph stands for a phenyl group;

said composition being photocuring.

2. The composition as claimed in claim 1 wherein said compound having at least one ethylenic unsaturated double bond in a molecule thereof is selected from the group consisting of polyethylene glycol di(meth)acrylate, polypropylene glycol di(meth)acrylate, trimethylolethane triacrylate, trimethylolpropane triacrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanedyol di(meth)acrylate, trimethylolpropane tri(acryloyloxypropyl) ether, tri(acryloyloxyethyl) isocyanurate, tri(acryloyloxyethyl) cyanurate, glycerine tri(meth)acrylate, (meth)acrylate of an addition reaction product prepared by adding ethylene oxide to a polyfunctional alcohol, (meth)acrylate of an addition reaction product prepared by adding propylene oxide to a polyfunctional alcohol, urethane acrylate, polyester acrylate, epoxy acrylate, and mixtures thereof.

3. The composition as claimed in claim 1 wherein said compound having at least one ethylenic unsaturated double bond in a molecule thereof is a compound having both an acid group and an ethylenic unsaturated double bond in a molecule thereof selected from the group consisting of carboxylic acid addition product of epoxy (meth)acrylate prepared by reacting an acid anhydride with a hydroxyl group generated by reacting (meth)acrylic acid with an epoxy group contained in a resin selected from the group consisting of bisphenol A epoxy resin, bisphenol F epoxy resin, novolak epoxy resin, polycarboxylic acid polyglycidyl ester, polyol polyglycidyl ether, aliphatic epoxy resin, alicyclic epoxy resin, amine epoxy resin, triphenolmethane epoxy resin, and dihydroxybenzene epoxy resin; a copolymer of maleic anhydride and a compound selected from the group consisting of ethylene, propylene, isobutylene, styrene, vinylphenol, acrylic acid, acrylate, and acrylamide, half-esterified by reacting a maleic anhydride portion of the copolymer with an acrylate selected from the group consisting of an acrylate having an alcoholic hydroxyl group and an acrylate having an epoxy group; a compound prepared by reacting acrylic acid with a hydroxyl group contained in a copolymer of an acrylate having an alcoholic hydroxyl group and a compound selected from the group consisting of acrylic acid and acrylate; and mixtures thereof.

4. The composition as claimed in claim 3 further comprising an epoxy resin selected from the group consisting of bisphenol A epoxy resin, bisphenol F epoxy resin, novolak epoxy resin, polycarboxylic acid polyglycidyl ester, polyol polyglycidyl ether, aliphatic epoxy resin, alicyclic epoxy resin, amine epoxy resin, trisphenolmethane epoxy resin, and dihydroxyphenyl epoxy resin, and mixtures thereof, a mixing ratio of said epoxy resin being not more than 40 parts by weight based on 100 parts by weight of said compound having both an acid group and an ethylenic unsaturated double bond in a molecule thereof.

5. The composition as claimed in claim 1 wherein said photopolymerization initiator is selected from the group consisting of benzyl, diacetyl, benzoin, benzoin methyl ether, benzoin ethyl ether, benzoin isopropyl ether, thioxanthone, 2,4-diethylthioxanthone, thioxanthone-1-sulfonic acid, thioxanthone-4-sulfonic acid, benzophenone, 4,4'-bis(dimethylamino)benzophenone, 4,4'-bis(diethylamino)benzophenone, acetophenone, p-dimethylaminoacetophenone, α,α'-dimethoxyacetoxyacetophenone, 2,2'-dimethoxy-2-phenylacetophenone, p-methoxyacetophenone, 2-methyl-(4-(methylthio)phenyl)-2-morpholino-1-propane, anthraquinone, 1,4-naphthoquinone, phenanthyl chloride, tribromomethylphenylsulfone, tris(trichloromethyl)-s-triazine, 2,4-bis(trichloromethyl)-6-(4-methoxyphenyl)triazine, di-t-butylperoxide, and mixtures thereof.

6. The composition as claimed in claim 1 wherein a mixing ratio of said photopolymerization initiator is 0.1 to 30 parts by weight based on 100 parts by weight of said compound having at least one ethylenic unsaturated double bond in a molecule thereof.

7. The composition as claimed in claim 1 further comprising an additional additive selected from the group consisting of a thermal polymerization inhibitor, an adhesion promoter, a dispersing agent, a plasticizer, a sagging inhibitor, a leveling agent, a defoaming agent, a flame retarder, a brightener, a coloring agent, and mixtures thereof.

8. An acrylic resin composition for electrodeposition for producing a color filter comprising:

100 parts by weight of an acrylic resin having acid value of 33.2 to 100 mgKOH/g, 5 to 90 parts by weight of a coloring pigment, a compound having at least one ethylenic unsaturated double bond in a molecule thereof, and a photopolymerization initiator, said acrylic resin having been prepared by polymerizing a monomer mixture comprising 1 to 6% by weight of α, β-unsaturated carboxylic acid, 10 to 85.7% by weight of α, β-unsaturated carboxylate and 5 to 30% by weight of N-substituted maleimide selected from the group consisting of N-cyclohexylmaleimide, N-2-methylcyclohexylmaleimide, N-2-ethylcyclohexylmaleimide, N-2-chlorocyclohexylmaleimide, N-phenylmaleimide, N-2-methylphenylmaleimide, N-2-ethylphenylmaleimide, N-2-chlorophenylmaleimide and mixtures thereof, said composition being photocuring.

9. An acrylic resin composition for electrodeposition for producing a color filter comprising:

100 parts by weight of an acrylic resin having acid value of 5 to 100 mgKOH/g, 5 to 90 parts by weight of a coloring pigment, a compound selected from the group consisting of polyethylene glycol di(meth)acrylate, polypropylene glycol di(meth)acrylate, trimethylolethane triacrylate, trimethylolpropane triacrylate, trimethylolpropane diacrylate, neopentyl glycol di(meth)acrylate, pentaerythritol tetra(meth)acrylate, pentacrythritol tri(meth)acrylate, dipentaerythritol hexa(meth)acrylate, dipentaerythritol penta(meth)acrylate, hexanedyol di(meth)acrylate, trimethylolpropane tri(acryloyloxypropyl)ether, tri(acryloyloxyethyl) isocyanurate, tri(acryloyloxyethyl) cyanurate, glycerine tri(meth)acrylate, (meth)acrylate of an addition reaction product prepared by adding ethylene oxide to a polyfunctional alcohol, (meth)acrylate of an addition reaction product prepared by adding propylene oxide to a polyfunctional alcohol, urethane acrylate, polyester acrylate, epoxy acrylate, and mixtures thereof, and a photopolymerization initiator, said acrylic resin having been prepared by polymerizing a monomer mixture comprising 1 to 6% by weight of α, β-unsaturated carboxylic acid, 10 to 85.7% by weight of α, β-unsaturated carboxylate and 5 to 30% by weight of N-substituted maleimide selected from the group consisting of N-cyclohexylmaleimide, N-2-methylcyclohexylmaleimide, N-2-ethylcyclohexylmaleimide, N-2-chlorocyclohexylmaleimide, N-phenylmaleimide, N-2-methylphenylmaleimide, N-2-ethylphenylmaleimide, N-2-chlorophenylmaleimide and mixtures thereof, said composition being photocuring.

10. An acrylic resin composition for electrodeposition for producing a color filter comprising:

100 parts by weight of an acrylic resin having acid value of 5 to 100 mgKOH/g, 5 to 90 parts by weight of a coloring pigment, a compound having both an acid group and an ethylenic unsaturated double bond in a molecule thereof selected from the group consisting of carboxylic acid addition product of epoxy (meth)acrylate prepared by reacting an acid anhydride with a hydroxyl group generated by reacting (meth)acrylic acid with an epoxy group contained in a resin selected from the group consisting of bisphenol A epoxy resin, bisphenol F epoxy resin, novolak epoxy resin, polycarboxylic acid polyglycidyl ester, polyol polyglycidyl ether, aliphatic epoxy resin, alicyclic epoxy resin, amine epoxy resin, triphenolmethane epoxy resin, and dihydroxybenzene epoxy resin; a copolymer of maleic anhydride and a compound selected from the group consisting of ethylene, propylene, isobutylene, styrene, vinylphenol, acrylic acid, acrylate, and acrylamide, half-esterified by reacting a maleic anhydride portion of the copolymer with an acrylate selected from the group consisting of an acrylate having an alcoholic hydroxyl group and an acrylate having an epoxy group; a compound prepared by reacting acrylic acid with a hydroxyl group contained in a copolymer of an acrylate having an alcoholic hydroxyl group and a compound selected from the group consisting of acrylic acid and acrylate; and mixtures thereof, and a photopolymerization initiator, said acrylic resin having been prepared by polymerizing a monomer mixture comprising 1 to 6% by weight of α, β-unsaturated carboxylic acid, 10 to 85.7% by weight of α, β-unsaturated carboxylate and 5 to 30% by weight of N-substituted maleimide selected from the group consisting of N-cyclohexylmaleimide, N-2-methylcyclohexylmaleimide, N-2-ethylcyclohexylmaleimide, N-2-chlorocyclohexylmaleimide, N-phenylmaleimide, N-2-methylphenylmaleimide, N-2-ethylphenylmaleimide, N-2-chlorophenylmaleimide and mixtures thereof, said composition being photocuring.

11. The composition as claimed in claim 10 further comprising an epoxy resin selected from the group consisting of bisphenol A epoxy resin, bisphenol F epoxy resin, novolak epoxy resin, polycarboxylic acid polyglycidyl ester, polyol polyglycidyl ether, aliphatic epoxy resin, alicyclic epoxy resin, amine epoxy resin, trisphenolmethane epoxy resin, dihydroxyphenyl epoxy resin, and mixtures thereof, a mixing ratio of said epoxy resin being not more than 40 parts by weight based on 100 parts by weight of said compound having both an acid group and an ethylenic unsaturated double bond in a molecule thereof.

* * * * *